United States Patent [19]

Rowden et al.

[11] 4,375,376

[45] Mar. 1, 1983

[54] RETARDED AGING, RIMMED STEEL WITH GOOD SURFACE QUALITY

[75] Inventors: Clifford E. Rowden, Bay Village; Gregory J. McLean, Brecksville; Joseph E. Franklin, Medina; Dionisyj W. Demianczuk, Parma, all of Ohio

[73] Assignee: Republic Steel Corporation, Cleveland, Ohio

[21] Appl. No.: 329,020

[22] Filed: Dec. 9, 1981

Related U.S. Application Data

[63] Continuation of Ser. No. 108,665, Dec. 31, 1979, abandoned.

[51] Int. Cl.³ .............................................. C22C 38/12
[52] U.S. Cl. .................................... 148/12 F; 75/129; 148/36; 148/39
[58] Field of Search ................. 148/2, 12 R, 12 F, 36, 148/39; 75/53, 123 J, 58, 123 B, 129; 164/56, 57, 96, 133

[56] References Cited

U.S. PATENT DOCUMENTS

| | | | |
|---|---|---|---|
| 2,356,450 | 8/1944 | Epstein et al. | 75/123 |
| 2,771,651 | 11/1956 | Morgan | 164/56 |
| 2,999,749 | 9/1961 | Saunders et al. | 75/123 B |
| 3,556,866 | 1/1971 | Gibbs | 148/2 |
| 3,558,370 | 1/1971 | Boni | 148/36 |
| 3,593,774 | 7/1971 | Gribble et al. | 164/58 |
| 3,865,643 | 2/1975 | Bales, Jr. et al. | 148/36 |
| 3,988,174 | 10/1976 | Kawano | 148/36 |
| 4,092,179 | 5/1978 | Charpentier et al. | 148/36 |

FOREIGN PATENT DOCUMENTS

| | | | |
|---|---|---|---|
| 45-845 | 1/1970 | Japan | 148/2 |
| 49-7295 | 2/1974 | Japan | 75/123 J |

*Primary Examiner*—Peter K. Skiff
*Attorney, Agent, or Firm*—Cooper, Dunham, Clark, Griffin & Moran

[57] ABSTRACT

A rimmed steel product, in as-hot-rolled, or cold rolled and annealed form, is made essentially non-aging by inclusion of one or both of the aging-retardant elements vanadium and boron, while retaining an excellent, clear surface that is not adversely affected by the presence of such element or elements. To produce such articles, an ingot mold is poured 80 to 95% full of plain rimming steel, and the molten steel is allowed to rim, e.g. for several minutes, until a rimmed shell solidifies against the mold wall. Then pouring is completed with the same steel, while adding one or both of the aging-retardant elements to the teemed stream. Processed like rimmed steel, ultimate rolled (e.g. strip) products having a thin, truly rimmed skin over a main body of substantially non-aging steel, are found to exhibit no unwanted change of properties (e.g. as would be revealed by significant strain lines) such as usually characterizes the effect of aging in rimmed steel. There is some advantage in using the two elements together, or in the simultaneous inclusion of other, strength-promoting elements such as Cb, Zr, Si, and it has been noted that tensile properties are enhanced when V is added, as above, for aging-retardant function.

16 Claims, No Drawings

RETARDED AGING, RIMMED STEEL WITH GOOD SURFACE QUALITY

This is a continuation of application Ser. No. 108,665, filed Dec. 31, 1979, now abandoned.

BACKGROUND OF THE INVENTION

This invention relates to rimmed steel products and methods of producing them, being products resulting from rolling operations, i.e. hot rolling and for presently preferred uses, also cold rolling with appropriate annealing. The invention is more particularly related to rimmed steel products of the stated character, which are essentially non-aging, the latter term being used herein as equivalent to retarded aging, in the sense of aging being so retarded, e.g. under expected temperatures of use, as to have no significantly adverse effect on the properties of the steel or articles formed from it over indefinite periods of time.

It has long been known that rimmed steel, although having many virtues in the areas of ingot metal yield, superior surface, and good qualities of forming, e.g. drawing, bending and the like, and also articles formed from such steel, are susceptible to so-called aging which affects the mechanical properties in a manner which may be undesirable for some uses. It has also long been known that addition of vanadium, i.e. to the molten steel in the ladle before pouring ingots, has the effect of retarding aging in the ultimate products, resulting in what have been called non-aging rimming steels; in such case, the vanadium has been stated to combine with nitrogen while permitting a mild rimming action. Addition of boron in like manner has been known to have similar effect in retarding aging.

It is found, nevertheless, that the non-aging, vanadium-added or boron-added steels as just described, although purportedly of rimmed character, are deficient especially in that the surface zone is by no means equivalent to that of ordinary or plain carbon, rimmed steel. The clear, clean surface of normal rimmed steel is extremely important, for example in such uses as automotive body stock, where a formed surface free from irregularities is required; the tendency of the previous vanadium-added (or boron-added) steels is to exhibit relatively poor surfaces, unsuitable for the purposes. A special requirement is for a rimmed steel sheet which in cold-rolled, annealed, and temper rolled condition exhibits little or no Lüders strain (with characteristic surface lines) and which after forming, and after an interval that normally involves aging, exhibits no appearance of Lüders strain, returned. Hence, there has remained a need for an essentially non-aging rimmed steel having the advantages of such steel, in production and use, and having excellent surface characteristics especially in the cold-rolled, annealed and temper rolled condition.

SUMMARY OF THE INVENTION

The invention is predicated on the finding that significant improvement in rimmed steel products as defined above is attainable by providing a cast ingot in which there is an outer layer or skin of fully rimmed steel, of normal composition for rimming, surrounding an ultimately solidified core of the same composition but including a significant content of vanadium or boron (or both) for retarding aging. Thus, the basic composition may be 0.04 to 0.12% (most usually 0.07 to 0.11%) carbon, 0.2 to 0.8% manganese, 0.035 max. % sulfur, balance iron and incidentals; all percentages herein are in weight percent. The new products are made by a special procedure, as follows: Molten steel, as of the above base composition, is poured into an ingot mold up to a filling level of 80% or more, e.g. between 80% and 95% and preferably around 85% to 90%. Teeming is interrupted and the effervescent rimming action which characterizes this basic melt is allowed to proceed, as for at least one minute, preferably from two to five minutes or even more (depending on conditions, or on the desired outer layer), until a shell or skin next to the mold wall has solidified, as to a thickness of 0.75 to 4 inches. Then pouring is resumed from the ladle, i.e. metal of the same composition, but with simultaneous addition of vanadium or boron, for example by feeding small particles of ferro-vanadium (e.g. 35 to 80% V) or ferro-boron, into the stream of molten metal or into the molten core, to provide a content of 0.01 to 0.2% V in the core, or up to 0.05% B.

The operation of back-filling the mold, i.e. completing the filling in the manner stated while adding vanadium or boron (or both) causes the additional material to mix into the molten core of the partly cast ingot, whereby the completed ingot has a vanadium-added or boron-added core surrounded by an outer layer of plain rimmed steel which becomes essentially pure ferrite. The core retains some rimming action even after back-filling, and in consequence, the total solidification practice may be essentially as for normal rimming steel, with relatively short, so-called track time, being the interval needed between teeming and the time for moving the filled ingot mold from the melt shop to the soaking pit area, in contrast to the requirements of aluminum killed steel which is the usual non-aging alternative. The ingot yield of metal is also, as is characteristic of rimmed steel, greater than for AK steels, so that for these reasons, production capacity is increased and likewise shipping capability, in comparison with aluminum killed metal in respect to which the present products have many of the same properties and uses, as will be apparent hereinbelow.

Ingots so produced are processed by conventional operations appropriate to plain rimmed steel, i.e. rolled to slabs, hot rolled to strip (e.g. 0.06 to 0.5 inch thick), pickled, cold rolled to the desired final gauge, then annealed (continuously or as coils) at suitable temperature under protective atmosphere, and if desired, temper rolled. The steel is also eminently useful in as-hot-rolled form (such as strip), e.g. hot rolled black or hot rolled pickled.

Each product derived from the ingots so produced, whether hot rolled or cold rolled, has a thin skin at its principal surface (i.e. consisting of both sides of the strip) which is plain rimmed steel lacking aging-retardant elements and is thus essentially ferrite with a clear, clean surface, normal for such steel. At the same time, the body or core of the product contains vanadium or boron, and provides an essentially non-aging steel article, but lacking the surface problems of previous vanadium-added or boron-added, rimmed steels. Moreover, in the pouring operation described above, the rimming action (e.g. for several minutes) prior to the addition of vanadium or boron allows the nitrogen level in the molten portion of the ingot to stabilize; hence, better control of the stabilizing action of the additive is achieved, i.e. more control of the V- or B-nitrogen reaction, in contrast to addition of V or B at the outset. As stated, the products have essentially the same freedom from aging as aluminum-killed steels, in that by tests sufficient to demonstrate absence of aging, there is no material change in properties over extended periods of time (e.g. 30 days at room temperature) or upon so-called artificial aging (e.g. 1 or 2 hours at 212° F.), while the products have greatly superior surface properties as compared with previous vanadium-added and boron-added rimmed steels and especially as compared with aluminum-killed steels that are notorious for inclusions at or near the surface. It has also been discovered that the new products, especially where vanadium is added in suitable amount, and for example when converted to the cold-rolled and annealed state, have unexpectedly higher yield strength than ordinary, vanadium-free, rimmed steels of otherwise identical composition.

Further details and examples of the invention are set forth hereinbelow.

DETAILED DESCRIPTION

In particular, the invention is carried out by preparing a melt of rimming steel, e.g. 0.07 to 0.11% C, 0.2 to 0.8% Mm, 0.035 max. % S, in a suitable furnace such as a so-called basic oxygen type furnace or one employing a similar process. Such melt is used in the first stage of pouring each ingot, the steel in the ladle being teemed into the ingot mold until the latter is, for instance, 85% to 90% full; the flow is then interrupted. While similar partial filling is performed in one or more further ingot molds, the first poured steel, which has been undergoing rimming action, freezes against the walls of the mold, thus yielding a solidified shell or skin. Such action may require from two to five minutes or more, possibly up to 15 minutes depending on thickness desired for the solid rimmed zone. This step is then immediately followed by final filling (back-filling) with further steel from the ladle (which is brought back for the purpose), while at the same time adding the element vanadium, e.g. as ferro-vanadium, or boron (e.g. ferro-boron), and in the manner described above. As will be understood, the ladle can then be moved along for similar back-filling of further partly filled mold or molds that may be waiting.

The added vanadium is found useful for retarded aging in amounts of 0.01 to 0.2% in the ingot core, preferably at least 0.04% to take advantage of the discovery of improved yield strength in the ultimate cold rolled product. Alternatively, boron, considered the equivalent of vanadium for retarded aging, but somewhat more economical, can be similarly added to achieve 0.004 to 0.04% B in the ingot core. Most conveniently, the addition is made with solid particles of ferro-vanadium, or vanadium alone, or ferro-boron, or boron alone, for example not larger than about ¼ inch, which are fed directly into the stream of molten steel falling from the bottom of the ladle into the mold. As will be understood, techniques and devices are available for such feeding; the operation can be timed to begin just after the start of back-filling and to end just before the latter is finished. The vanadium or boron addition can be made in other ways, as directly into the molten core where the teeming metal strikes, or alternatively by making wire or rod of the ferro-alloy and pushing such into the molten steel core. The chief aim is to get the addition made not later than the end of back-filling.

By way of one example, four experimental, commercial size ingots were produced, in 67 inch by 88 inch high open top molds each having a capacity of 25 tons, using a base heat of rimming steel of the composition 0.05% C, 0.35% Mn, 0.018% S, balance iron and incidentals, and following the procedure described above. Each mold was first poured 85% full, then allowed to rim for four minutes; during back-filling, each mold was injected (in the back-filling stream) with ferro-vanadium containing 40 lbs. of vanadium thereby adding 0.08% V to the core. These ingots were fully processed, in conventional manner for rimmed steel, through hot and cold rolling, to coils of cold-rolled and annealed steel strip, 59.488 inches wide and 0.031 inch thick. Tests throughout the length of one coil showed highly satisfactory properties as rimmed steel, with the desired absence of aging and with excellent surface quality.

As further examples, several other ingots of commercial size were produced in accordance with the invention, with vanadium added during back-filling, the 85%-full ingots being allowed first to rim for 4 to 5 minutes while the outer layer solidified. The cold rolled and annealed sheet (strip) product in each case was desirably non-aging and had very good surface quality, as required for automotive and like purposes.

In one of these instances, the base, rimming composition was 0.11% C, 0.35% Mn, 0.021% S, balance iron and incidentals; the core additionally contained 0.075% V. The mechanical properties of the cold rolled strip (0.050 inch thick) included the following:

|  | Yield Strength (ksi) | Tensile Strength (ksi) | Elongation (%) |
|---|---|---|---|
| Longitudinal | 37.1 | 52.7 | 37 |
| Transverse | 39.5 | 54.1 | 36 |

In the second of these instances, the base, rimming composition was 0.08% C, 0.34% Mn, 0.025% S, balance iron and incidentals; the core additionally contained 0.093% V. The mechanical properties of the cold rolled strip (0.050 inch thick) included the following:

|  | Yield Strength (ksi) | Tensile Strength (ksi) | Elongation (%) |
|---|---|---|---|
| Longitudinal | 41.1 | 52.5 | 38 |
| Transverse | 42.0 | 53.9 | 37 |

The mechanical properties noted in the above two examples were remarkably good (being high yield strength, with advantageous elongation) and are now attributed to the content of the vanadium; it does not appear that previous vanadium-added, rimmed steels (not produced according to this invention) were observed to have any unusual properties of this sort, i.e. noticeably different from ordinary rimmed steel. Indeed, normal, vanadium-free, rimmed steels of the base composition described herein, in the cold rolled and annealed condition, usually exhibit yield strength of less than 30 ksi. To achieve yield strengths in the range of 30 to 50 ksi in the steels of the invention, vanadium contents of 0.04 to 0.20% are required in the core steel; for example, to reach 50 ksi, at least 0.10% V is deemed requisite. The result is of special importance for automotive applications of such steel, i.e. for components where thickness can be reduced with a saving of weight while retaining desired strength.

Although additions of boron have not, alone, been observed to afford the strength-promoting effects of vanadium, these elements (boron and vanadium), in their respective stated concentrations, are functional equivalents for the basic purpose of the invention, namely to achieve a substantially non-aging character for the steel products having the excellent surface properties of ordinary rimmed steel. The elements can also be used together (each within the stated ranges) for some mutual enhancement of the non-aging effects; each can then be said to protect the other, i.e. in the sense of allowing the other to be more effective in its role of combining with and removing from solution nitrogen present in the steel. For example, if boron is considered the primary contibutor to the retarding of aging, vanadium can also simultaneously be added in amount up to 0.05% for protecting the boron as above, or in amounts in the range greater than 0.04% to afford higher tensile properties as well. V and B are also both oxide formers.

Two further, experimental, commercial-size ingots were produced following the procedure described above, i.e. involving first partly pouring the open-top mold (e.g. 90%) with plain rimming steel, then allowing the rimming metal to stand while a skin solidifies, and finally back-filling while adding further elements (in the teemed stream) to complete the core composition as described below.

To one of these ingots the injection contained both ferro-boron and ferro-vanadium. After suitable hot rolling, the metal from this ingot was converted to two cold-rolled, annealed, and temper rolled coils. The composition of the core steel (considered in effect as that of the strip) was 0.05 to 0.07% C, 0.31 to 0.37% Mn, 0.010% P, 0.016 to 0.020% S, 0.03 to 0.04% V and 0.005 to 0.010% B, balance iron and incidentals. Mechanical properties were: yield strength, 27 to 34 ksi; tensile strength, 44 to 51 ksi; elongation, 36 to 43%. After aging either at 500° F. for 15 seconds or at 212° F. for 1 hour, the material exhibited no Lüders strain.

To the molten metal of the other of the ingots, ferro-boron (alone) was injected during back-filling. From the steel of this ingot, after hot rolling, a coil of cold-rolled, annealed and temper rolled steel strip was produced, having a skin of rimmed steel at its principal surface area and internally containing 0.068 to 0.070% C, 0.28% Mn, 0.010% P, 0.016% S and 0.009% B. Mechanical properties were: yield strength, 29 to 31 ksi; tensile strength, 43 to 45 ksi; elongation, 40 to 43%. This cold-rolled strip was substantially non-aging; after aging at 212° F. for 1 hour, no Lüders strain was observed, and after aging at 500° F. for 15 seconds, inner laps of the coil exhibited no Lüders strain, while outer laps showed very slight but acceptable Lüders strain.

Many uses are envisaged for the non-aging, good-surface steel of the present invention, whether as-hot-rolled or cold rolled, such as automotive bumpers, suspension slides for filing cabinets and other drawers, furniture, dent-resistant automotive panels, and structural parts for automotive and other purposes.

It is conceived that other elements may be added to the molten steel core in the ingot mold, along with the aging-retardant material (vanadium and/or boron) in at least a minimum amount of the latter for its aging-retarding function. Thus, one such element is columbium, to have similar effect against aging and in enhancement of tensile properties and also to have a protective function for boron, i.e. to constitute up to 0.01%, e.g. 0.005 to 0.01% of the core. Another such element is silicon, to impart solid solution strengthening to the steel (or its equivalent for such purpose, phosphorus), but very preferably in amounts insufficient to have any appreciable killing effect, i.e. up to 0.150%, e.g. 0.02 to 0.15% in the core. Other elements which can optionally be added to the core during back-filling include titanium (for strengthening and also to have protective effect, e.g. for boron), in amounts up to 0.01%, e.g. 0.001 to 0.01% Ti, and likewise zirconium, up to 0.01%, e.g. 0.001 to 0.01% Zr, as well as aluminum in protective but non-killing amount, up to 0.01%, e.g. 0.001 to 0.01% Al. In all cases, the supplemental element or elements can be added in the manner described above, as particles or small pieces of ferro-alloy or where possible as the uncombined element or in multi-element alloys with the vanadium or boron, or both, for example being injected into the back-filling stream of molten steel.

It is to be understood that the invention is not limited to the specific compositions and procedural steps hereinabove described, but may be carried out in other ways without departure from its spirit.

We claim:

1. A rimmed steel product which is produced by rolling and is essentially non-aging, consisting of a skin of rimmed steel which is essentially ferrite, over the principal surface area of the product, and beneath said skin a core of substantially non-aging rimmed steel, the steel of said skin consisting essentially of 0.04 to 0.12% C, 0.2 to 0.8% Mn, and 0.035 max. % S, balance iron and incidental elements, said core consisting essentially of 0.04 to 0.12% C, 0.2 to 0.8% Mn, 0.035 max. % S, together with aging-retardant element or elements selected from the group consisting of 0.075 to 0.2% V, 0.009 to 0.04% B, or 0.03 to 0.2% V and 0.005 to 0.04% B, said core also containing one or more elements from the group consisting of 0 to 0.01% Cb, 0 to 0.15% Si, 0 to 0.01% Ti, 0 to 0.01% Zr; and 0 to 0.01% Al, balance iron and incidental elements.

2. A rimmed steel product as defined in claim 1, in which the core contains 0.075 to 0.2% V.

3. A rimmed steel product as defined in claim 1, in which the core contains 0.009 to 0.04% B.

4. A rimmed steel product as defined in claim 1, which is cold-rolled and annealed strip and contains 0.05 to 0.11% C.

5. A rimmed steel product as defined in claim 4, in which the core contains 0.075 to 0.2% V.

6. A rimmed steel product as defined in claim 4, in which the core contains 0.009 to 0.04% B.

7. A rimmed steel product as defined in claim 1, which is cold-rolled and annealed strip in which the core contains 0.075 to 0.2% V.

8. A rimmed steel product as defined in claim 1, which is cold-rolled and annealed strip in which the core contains 0.009 to 0.04% B.

9. A rimmed steel product which is produced by rolling and is essentially non-aging, consisting of a skin of rimmed steel which is essentially ferrite, over the principal surface area of the product, and beneath said skin a core of substantially non-aging rimmed steel, the steel of said skin consisting essentially of 0.05 to 0.12% C, 0.2 to 0.8% Mn, and 0.035 max. % S, balance iron and incidental elements, said core consisting essentially of 0.05 to 0.12% C, 0.2 to 0.8% Mn, 0.035 max. % S, together with aging-retardant element or elements selected from the group consisting of 0.075 to 0.2% V, 0.009 to 0.04% B or 0.03 to 0.2% V and 0.005 to 0.04% B.

10. A rimmed steel product as defined in claim 9, which has been produced by hot rolling and consists of as-hot-rolled strip having thickness of 0.05 to 0.5 inch.

11. A rimmed steel product as defined in claim 9, which is cold-rolled and annealed strip.

12. A cold-rolled, rimmed steel product as defined in claim 11, in which said skin of ferrite, over each face of the strip, has a thickness of about 0.0003 to 0.003 inch.

13. A method of making an essentially non-aging, rolled product of rimmed steel, comprising pouring an ingot mold 80% to 95% full of molten steel consisting essentially of 0.04 to 0.12% C, 0.2 to 0.8% Mn, 0.035 max. % S, balance iron and incidental elements, allowing said filling to undergo rimming action while a shell of rimmed steel solidifies next to the mold surrounding a still-molten core, and then completing pouring of said molten steel into said ingot mold while adding to the molten steel in the mold, sufficient material to provide in the finished core: steel having the aforesaid composition together with aging-retardant element or elements selected from the group consisting of 0.075 to 0.2% V, 0.009 to 0.04% B, or 0.03 to 0.2% V and 0.005 to 0.04% B, and also together with 0 to 0.01% Cb, 0 to 0.15% Si, 0 to 0.01% Ti, 0 to 0.01% Zr, and 0 to 0.01% Al; and after solidification of the ingot, converting the same by rolling, to a rolled product having a skin of rimmed steel which is essentially ferrite, over the principal surface area of the product.

14. A method as defined in claim 13, in which the first-described pouring of steel is to about 85 to 90% of filling of the mold and in which the addition of aging-retardant element or elements to the molten steel in the mold includes vanadium in sufficient amount to provide 0.075 to 0.2% V in the finished core.

15. A method as defined in claim 13, in which the aging-retarding element or elements are added to the molten steel in the mold by adding at least one of the alloys ferro-vanadium and ferro-boron.

16. A method as defined in claim 13, in which after said first-described pouring of steel, said partial filling of the mold is allowed to stand, before said completion of pouring, for a time of about 2 to 5 minutes, to permit solidification of said shell to about 0.75 to 4 inches thick.

* * * * *